United States Patent
Hagino

(10) Patent No.: US 11,401,977 B2
(45) Date of Patent: Aug. 2, 2022

(54) VEHICULAR POWER TRANSMISSION DEVICE

(71) Applicant: TOYOTA JIDOSHA KABUSHIKI KAISHA, Aichi-ken (JP)

(72) Inventor: Yoshiteru Hagino, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 311 days.

(21) Appl. No.: 16/660,707

(22) Filed: Oct. 22, 2019

(65) Prior Publication Data

US 2020/0132131 A1  Apr. 30, 2020

(30) Foreign Application Priority Data

Oct. 25, 2018  (JP) .............................. JP2018-200991

(51) Int. Cl.
*F16C 33/66* (2006.01)
*F16D 3/84* (2006.01)

(52) U.S. Cl.
CPC .......... *F16D 3/843* (2013.01); *F16C 33/6659* (2013.01); *F16C 2326/01* (2013.01); *F16D 2300/06* (2013.01)

(58) Field of Classification Search
CPC .. F16D 3/843; F16D 2300/06; F16C 33/6659; F16C 2326/01
USPC .............................................. 384/473; 464/7
See application file for complete search history.

(56) References Cited

U.S. PATENT DOCUMENTS

| | | | | |
|---|---|---|---|---|
| 2,368,963 | A | * | 2/1945 | Boden .................... F16C 19/548 |
| 5,232,291 | A | * | 8/1993 | Kuan ................... F16C 33/6651 384/473 |
| 10,801,596 | B2 | * | 10/2020 | Niwata .................... F16H 48/19 |
| 2017/0067512 | A1 | | 3/2017 | Nakawatari et al. |

FOREIGN PATENT DOCUMENTS

| | | |
|---|---|---|
| JP | 2017-53385 A | 3/2017 |
| JP | 201825258 A | 2/2018 |
| JP | 2018155338 A | 10/2018 |

* cited by examiner

*Primary Examiner* — Greg Binda
(74) *Attorney, Agent, or Firm* — Hauptman Ham, LLP

(57) ABSTRACT

A vehicular power transmission device includes: a support member; first and second rotating shafts rotating about a shaft; and first and second bearings supporting first and second rotating shaft, respectively, to be rotatable with respect to the support member. Further, an oil hole is formed in the support member for supplying lubricating oil to a space between the first bearing and the second bearing, the space is divided into first and second spaces on sides of first and second bearings, respectively, by a partition wall formed on the support member, the oil hole is formed in the support member so as to discharge the lubricating oil to one space of the first space and the second space, and a communication hole communicating with the first space and the second space is formed in the partition wall.

10 Claims, 4 Drawing Sheets

VEHICULAR POWER TRANSMISSION DEVICE

CROSS-REFERENCE TO RELATED APPLICATION(S)

The present application claims priority to and incorporates by reference the entire contents of Japanese Patent Application No. 2018-200991 filed in Japan on Oct. 25, 2018.

BACKGROUND

The present disclosure relates to a vehicular power transmission device.

For example, Japanese laid-open Patent Publication No. 2017-053385 discloses a vehicular power transmission device in which a first bearing (ball bearing 54) that supports a first rotating shaft (second rotor shaft 28) to be rotatable with respect to a support member (case 19) and a second bearing (ball bearing 56) that supports a second rotating shaft (reduction shaft 26) that rotates about the same axis as the first rotating shaft to be rotatable with respect to the support member are adjacently arranged, and an oil hole for supplying lubricating oil to a space formed between the first bearing and the second bearing is formed in the support member.

SUMMARY

There is a need for providing a vehicular power transmission device capable of favorably lubricating a bearing and a fitting part of the bearing.

According to an embodiment, a vehicular power transmission device includes: a support member; a first rotating shaft rotating about an axis; a first bearing supporting the first rotating shaft to be rotatable with respect to the support member; a second rotating shaft rotating about the axis; and a second bearing supporting the second rotating shaft to be rotatable with respect to the support member. Further, the first bearing and the second bearing are adjacently arranged, an oil hole is formed in the support member for supplying lubricating oil to a space formed between the first bearing and the second bearing, the space is divided into a first space on a side of the first bearing and a second space on a side of the second bearing by a partition wall formed on the support member, the oil hole is formed in the support member so as to discharge the lubricating oil to one space of the first space and the second space, and a communication hole that communicates with the first space and the second space is formed in the partition wall.

DETAILED DESCRIPTION

In the vehicular power transmission device disclosed in Japanese laid-open Patent Publication No. 2017-053385, the lubricating oil supplied from the oil hole is agitated by the first bearing (specifically, the cage of the first bearing), and the agitated lubricating oil is further agitated by the second bearing (specifically, the cage of the second bearing). Thus, the lubricating oil is agitated many times, and this generates air bubbles. Accordingly, the oil film formability by lubrication decreases due to the air bubbles, and each bearing and a narrow space, such as a fitting portion to which each bearing is fitted, are worn. In particular, since the lubricating oil supplied from the oil hole is directed to the second bearing by the agitation of the first bearing, the lubricating oil amount of the first bearing becomes relatively smaller than the lubricating oil amount of the second bearing, which causes the first bearing and the fitting portion to which the first bearing is fitted to be worn.

A vehicular power transmission device according to an embodiment of the present disclosure is described with reference to the accompanied drawings. The present disclosure is not limited to the following embodiment. In addition, the constituent elements in the following embodiment include those that can be easily replaced by those skilled in the art or are substantially the same.

Figure 1:
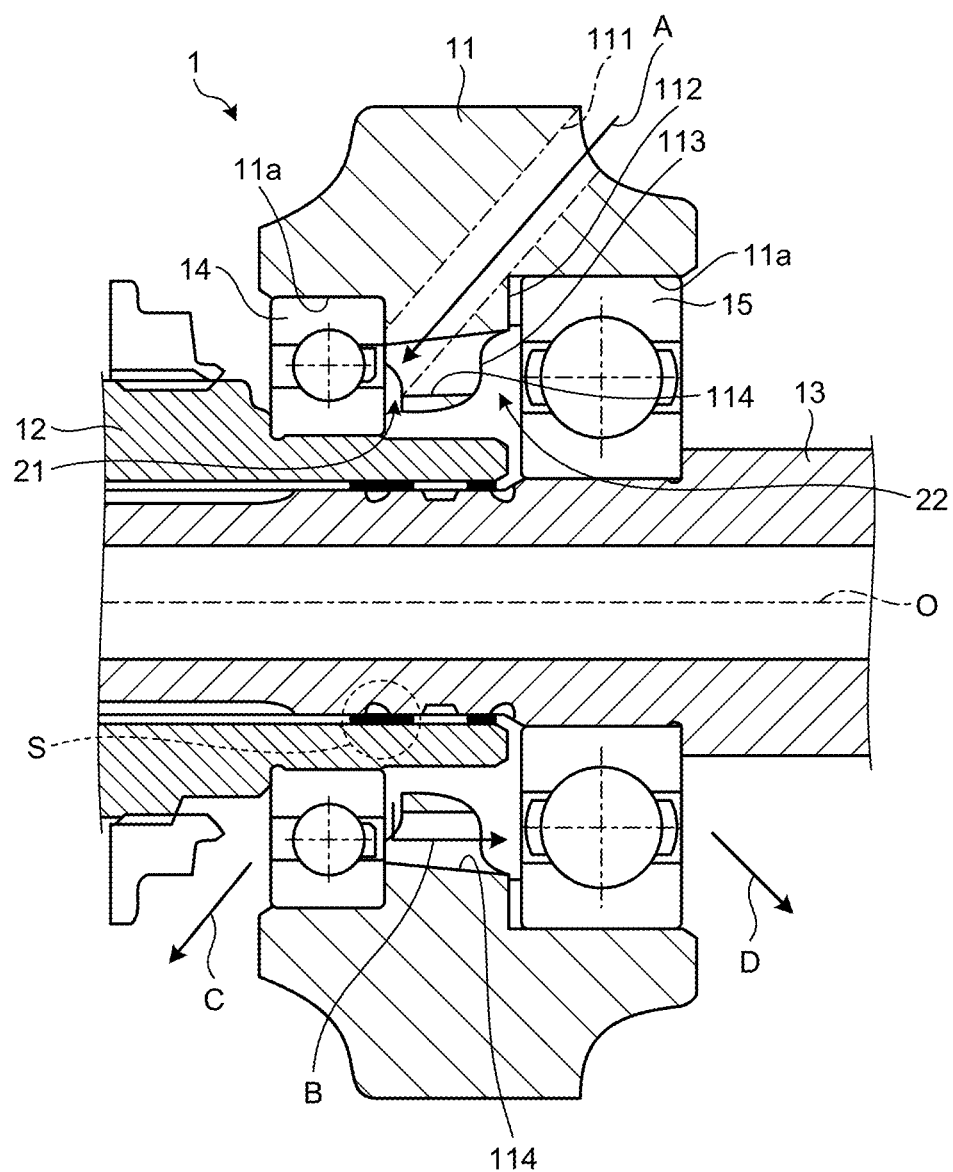
FIG. 1 is a diagram schematically illustrating a configuration of a vehicular power transmission device according to an embodiment of the present disclosure.

A vehicular power transmission device 1 according to the present embodiment is mounted in, for example, a hybrid vehicle, and includes, as illustrated in FIG. 1, a support member 11, a first rotating shaft 12, a second rotating shaft 13, a first bearing 14, and a second bearing 15. FIG. 1 schematically illustrates the vehicular power transmission device 1 cut along the line A1-A1 in FIG. 2. The arrows A, B, C, and D in FIGS. 1 and 2 indicate the flows of lubricating oil in the vehicular power transmission device 1.

Specifically, the support member 11 is a case that accommodates the first rotating shaft 12 and the second rotating shaft 13. Lubricating oil is injected inside the case. In the support member 11, an oil hole 111 for supplying lubricating oil to a space formed between the first bearing 14 and the second bearing 15 is formed. The support member 11 has a facing surface 112 that faces the outer ring of the second bearing 15.

The oil hole 111 is formed to be inclined with respect to the radial direction of the first bearing 14 orthogonal to the axis O. The oil hole 111 is formed in the support member 11 so as to discharge lubricating oil to either a first space 21 or a second space 22 to be described later. The oil hole 111 according to the present embodiment is formed so as to be inclined with respect to the first space 21 (the first bearing 14 side) in order to discharge lubricating oil to the first space 21 as indicated by the arrow A in FIG. 1.

Note that, the oil hole 111 is only required to be formed at any position in the support member 11 so as to be inclined with respect to either the first space 21 or the second space 22. That is, the oil holes 111 may be on the cross section of the support member 11 illustrated in FIG. 1 or on another cross section of the support member 11 different from the cross section illustrated in FIG. 1.

The support member 11 is provided with a partition wall 113. The partition wall 113 is provided in a space between the first bearing 14 and the second bearing 15 so as to project in the space. That is, the partition wall 113 is formed between the first bearing 14 and the second bearing 15 so as to project inward in the radial direction. By providing the partition wall 113 in the space between the first bearing 14 and the second bearing 15, the space between the first bearing 14 and the second bearing 15 is divided into a first space 21 on the first bearing 14 side and a second space 22 on the second bearing 15 side.

By providing the partition wall 113 on the support member 11 and dividing the space between the first bearing 14 and the second bearing 15 into the two spaces in this manner, the first bearing 14 agitates only the lubricating oil in the first space 21 and the second bearing 15 agitates only the lubricating oil in the second space 22. Thus, it is possible to prevent the lubricating oil agitated by one bearing of the first bearing 14 and the second bearing 15 from being further agitated by the other bearing and to prevent air bubbles from being generated.

In addition, by providing the partition wall 113 on the support member 11, it is possible for the first space 21 or the second space 22 to function as an oil reservoir. In the present embodiment, since the oil hole 111 is formed so as to be inclined with respect to the first space 21 in order to discharge lubricating oil to the first space 21, the first space 21 functions as an oil reservoir.

The first rotating shaft 12 is specifically a rotor shaft of a motor (not illustrated). The second rotating shaft 13 is specifically a reduction shaft. The first rotating shaft 12 and the second rotating shaft 13 rotate about the same axis O. The first rotating shaft 12 and the second rotating shaft 13 are connected via a spline fitting portion S.

The first bearing 14 is, for example, a ball bearing, and supports the first rotating shaft 12 so as to be rotatable with respect to the support member 11. The first bearing 14 specifically includes an inner ring externally fitted to the outer peripheral surface of the first rotating shaft 12 and an outer ring internally fitted to an inner peripheral surface 11a of the support member 11. The first bearing 14 and the second bearing 15 are adjacently disposed, and are, more specifically, disposed so as to face each other in the direction of the axis O.

The second bearing 15 is, for example, a ball bearing, and supports the second rotating shaft 13 so as to be rotatable with respect to the support member 11. The second bearing 15 specifically includes an inner ring externally fitted to the outer peripheral surface of the second rotating shaft 13 and an outer ring internally fitted to the inner peripheral surface 11a of the support member 11.

Figure 2:
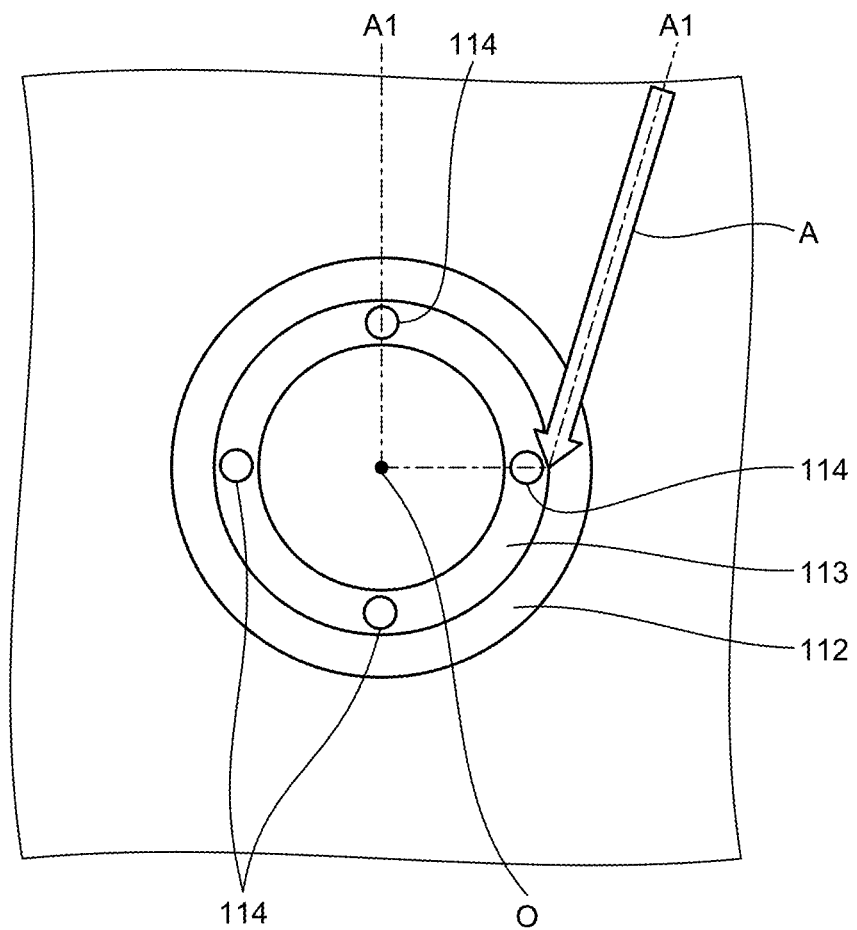
FIG. 2 is a front view schematically illustrating a structure of a support member in the vehicular power transmission device according to the embodiment of the present disclosure.

In the partition wall 113, a communication hole 114 that communicates with the first space 21 and the second space 22 is formed. For example, as illustrated in FIG. 2, the communication hole 114 has a circular cross-sectional shape, and is formed at a plurality of positions of the partition wall 113. Note that, four communication holes 114 are formed at rotationally symmetrical positions with respect to the axis O. The cross sectional shape, formation position, size, and number of the communication holes 114 are not limited to the example illustrated in the drawing, and can be suitably changed depending on a desired oil amount or the like of the lubricating oil to be supplied from one of the first space 21 and the second space 22 to the other through the communication holes 114.

For example, if the support member 11 is provided only with the partition wall 113, the first space 21 and the second space 22 can be formed by the partition wall 113, and the lubricating oil agitated by one bearing of the first bearing 14 and the second bearing 15 is not further agitated by the other bearing.

However, by providing the partition wall 113, the space between the first bearing 14 and the second bearing 15 is reduced, and the supply path of lubricating oil is also reduced. In addition, since the angle and position of the oil hole 111 are restricted, the oil hole 111 is formed to be inclined with respect to the first space 21 as illustrated in FIG. 1, for example. Thus, if the support member 11 is provided only with the partition wall 113, the supply of lubricating oil to the first space 21, that is, to the first bearing 14 side is increased compared to the second space 22.

For this reason, in the vehicular power transmission device 1 according to the present embodiment, the communication hole 114 is formed in the partition wall 113, and this allows the lubricating oil supplied from the oil hole 111 to the first space 21 as indicated by the arrow A in FIG. 1 to be supplied to the second space 22 through the communication hole 114 as indicated by the arrow B in FIG. 1.

Figure 3:
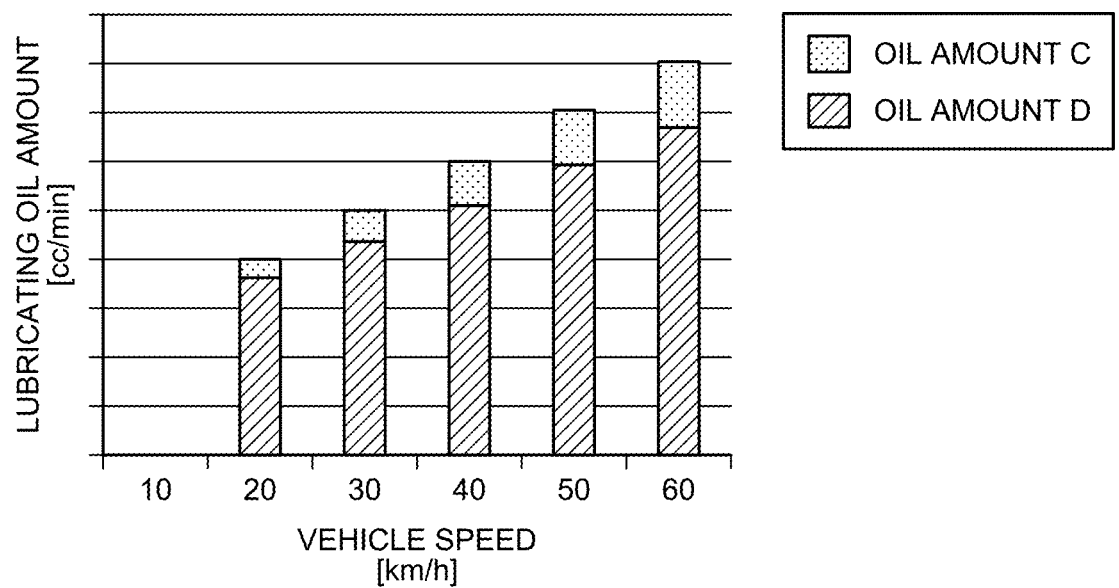
FIG. 3 is a graph for comparing the lubricating oil amount (oil amount C) of a first bearing with the lubricating oil amount (oil amount D) of a second bearing in a vehicular power transmission device in which a support member is provided with no partition wall.
Figure 4:
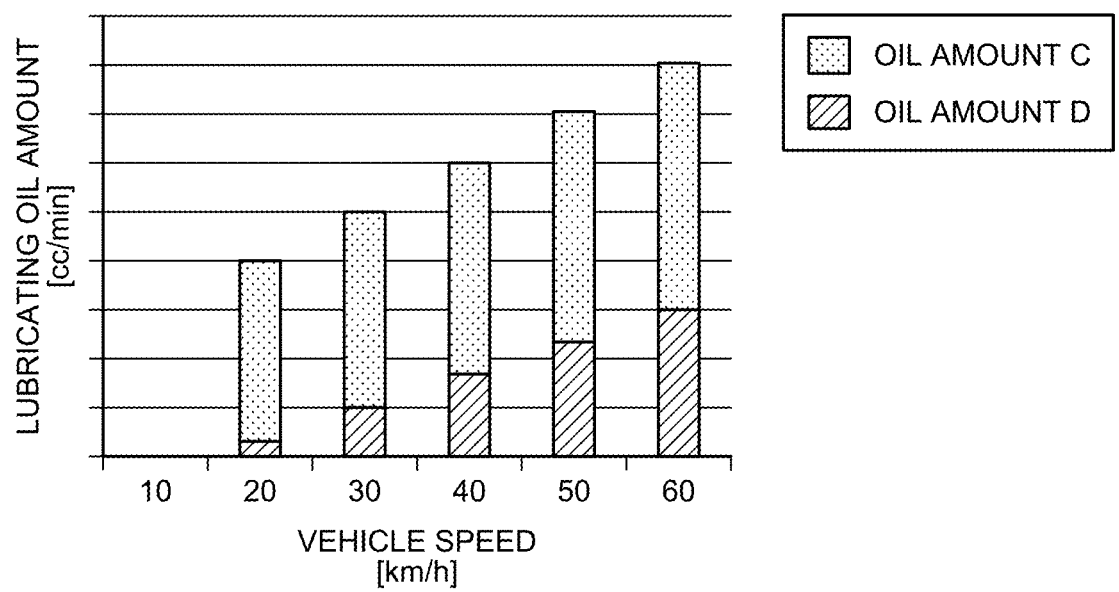
FIG. 4 is a graph for comparing the lubricating oil amount (oil amount C) of a first bearing with the lubricating oil amount (oil amount D) of a second bearing in a vehicular power transmission device in which a support member is provided with a partition wall and a communication hole is not formed in the partition wall.
Figure 5:
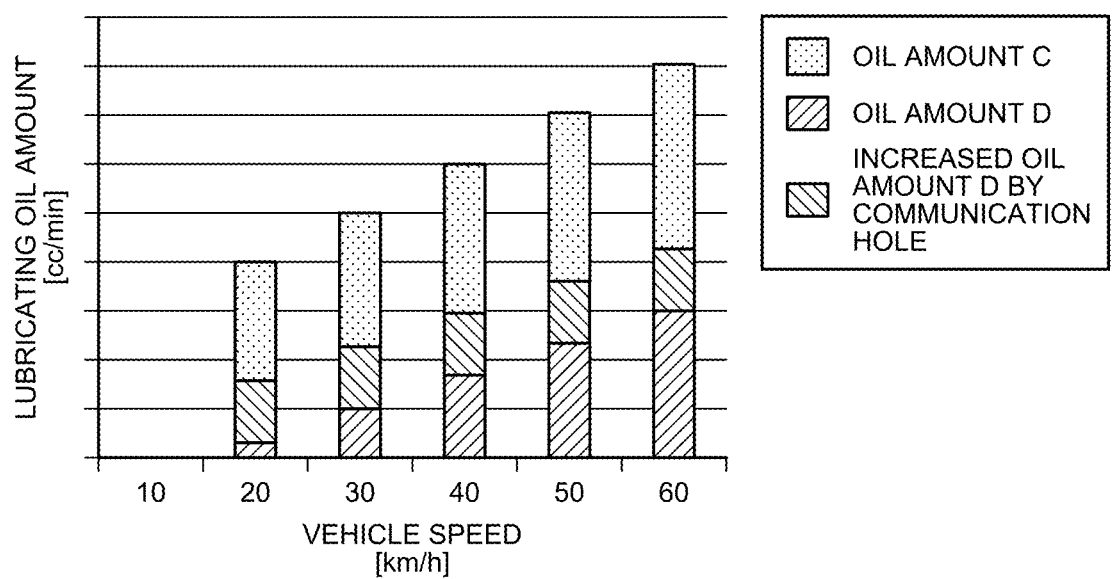
FIG. 5 is a graph for comparing the lubricating oil amount (oil amount C) of a first bearing with the lubricating oil amount (oil amount D) of a second bearing in a vehicular power transmission device according to the embodiment of the present disclosure in which a support member is provided with a partition wall and a communication hole is formed in the partition wall.

Here, FIG. 3 illustrates the relation between the vehicle speed and the lubricating oil amount in a vehicular power transmission device in which the support member 11 is not provided with the partition wall 113 (hereinafter, referred to as a "comparative example 1"). FIG. 4 illustrates the relation between the vehicle speed and the lubricating oil amount in a vehicular power transmission device in which the support member 11 is provided only with the partition wall 113 (hereinafter, referred to as a "comparative example 2"). FIG. 5 illustrates the relation between the vehicle speed and the lubricating oil amount in a vehicular power transmission device in which the support member 11 is provided with the partition wall 113 and the communication hole 114 is formed in the partition wall 113 (hereinafter referred to as a "disclosure example").

In the graphs of FIGS. 3 to 5, the portions indicated by dot hatching indicate the lubricating oil amount of the first bearing 14 (hereinafter, referred to as an "oil amount C") and the portions indicated by line hatching indicate the lubricating oil amount of the second bearing 15 (hereinafter, referred to as an "oil amount D"). In each of the comparative example 1, the comparative example 2, and the disclosure example, the oil hole 111 is inclined with respect to the first bearing 14.

In the comparative example 2 of FIG. 4, by providing the partition wall 113 on the support member 11, the first space 21 functions as an oil reservoir. Thus, the oil amount C in the comparative example 2 is increased compared to the oil amount C in the comparative example 1 of FIG. 3. On the other hand, in the comparative example 2, the lubricating oil is not supplied to the second space 22 until the lubricating oil is accumulated to the height of the partition wall 113 in the first space 21. Therefore, the oil amount D in the comparative example 2 is reduced compared to the oil amount D in the comparative example 1.

On the other hand, in the disclosure example of FIG. 5, by providing the partition wall 113 on the support member 11 and forming the communication hole 114 in the partition wall 113, the lubricating oil in the first space 21 is supplied to the second space 22 through the communication hole 114. Thus, the oil amount D in the disclosure example is increased compared to the oil amount D in the comparative example 2 of FIG. 4. In the disclosure example, it is possible for the lubricating oil in the first space 21 to be supplied to the second space 22 through the communication hole 114 while the lubricating oil is accumulated to the height of the partition wall 113 in the first space 21. Thus, in the disclosure example, it is possible to increase the lubricating oil amount of the second rotating shaft 13 from a low vehicle speed, using the water head pressure of the lubricating oil supplied from the communication hole 114.

With the vehicular power transmission device 1 according to the present embodiment as described above, the space formed between the first bearing 14 and the second bearing 15 is divided by the partition wall 113 provided on the support member 11 into the first space 21 and the second space 22, and it is thereby possible to prevent the lubricating oil agitated by one bearing of the first bearing 14 and the second bearing 15 from being further agitated by the other bearing.

In addition, with the vehicular power transmission device 1, the lubricating oil supplied from the oil hole 111 to one space of the first space 21 and the second space 22 is supplied to the other space through the communication hole 114, and it is thereby possible to prevent the supply of the lubricating oil from the oil hole 111 from being concentrated in one space of the first space 21 and the second space 22 and from being increased compared to the other space. Accordingly, with the vehicular power transmission device 1, it is possible to favorably lubricate the first bearing 14 and the second bearing 15, and the fitting portion of the first bearing 14 and the second bearing 15.

Furthermore, with the vehicular power transmission device 1, by forming the communication hole 114 in the partition wall 113 of the support member 11, it is possible to increase the lubricating oil amount of the second rotating shaft 13 from a low vehicle speed while the first rotating shaft 12 is securely lubricated.

The vehicular power transmission device according to the present disclosure has been specifically described with reference to the embodiment, but the gist of the present disclosure is not limited to the above description and should be widely interpreted based on the description of the scope of claims. In addition, it is obvious that various changes, modifications and the like based on the description are included in the gist of the present disclosure.

With a vehicular power transmission device according to the present disclosure, it is possible to prevent lubricating oil agitated by one bearing from being further agitated by the other bearing and to prevent the supply of lubricating oil from an oil hole to one space of a first space and a second space from being increased compared to the other space, and it is thereby possible to favorably lubricate a bearing and a fitting part of the bearing.

Further, in the vehicular power transmission device according to the present disclosure, the space formed between the first bearing and the second bearing is divided by the partition wall provided on the support member into the first space and the second space, and it is thereby possible to prevent the lubricating oil agitated by one bearing of the first bearing and the second bearing from being further agitated by the other bearing. In addition, the lubricating oil supplied from the oil hole to one space of the first space and the second space is supplied to the other space through the communication hole, and it is thereby possible to prevent the supply of the lubricating oil from the oil hole to one space of the first space and the second space from being increased compared to the other space.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular power transmission device, comprising:
a support member;
a first rotating shaft configured to rotate about an axis;
a first bearing configured to support the first rotating shaft to be rotatable with respect to the support member;
a second rotating shaft configured to rotate about the axis; and
a second bearing configured to support the second rotating shaft to be rotatable with respect to the support member, wherein
the first bearing and the second bearing are adjacently arranged,
an oil hole is formed in the support member for supplying lubricating oil to a space formed between the first bearing and the second bearing,
the space is divided into a first space on a side of the first bearing and a second space on a side of the second bearing by a partition wall formed on the support member,
the oil hole is formed in the support member so as to discharge the lubricating oil to one space of the first space and the second space,
the partition wall includes at least one communication hole extending along the axis and communicating with the first space and the second space,
the at least one communication hole is configured to guide the lubricating oil from one of the first space and the second space to the other of the first space and the second space without passing through any of the first bearing and the second bearing, and
the at least one communication hole is different from a gap, which is formed between the partition wall and the first rotating shaft or between the partition wall and the second rotating shaft.

2. The vehicular power transmission device according to claim 1, wherein the at least one communication hole of the partition wall includes a plurality of communication holes separate from each other.

3. The vehicular power transmission device according to claim 2, wherein the plurality of communication holes includes a first communication hole and a second communication hole opposite to the first communication hole in a radial direction perpendicular to the axis.

4. The vehicular power transmission device according to claim 2, wherein the plurality of communication holes is formed at rotationally symmetrical positions of the partition wall with respect to the axis.

5. The vehicular power transmission device according to claim 1, wherein the partition wall projects inward in a radial direction perpendicular to the axis to divide the space into the first and second spaces.

6. The vehicular power transmission device according to claim 5, wherein the at least one communication hole of the partition wall includes a plurality of communication holes separate from each other.

7. The vehicular power transmission device according to claim 5, wherein the plurality of communication holes includes a first communication hole and a second communication hole opposite to the first communication hole in a radial direction perpendicular to the axis.

8. The vehicular power transmission device according to claim 5, wherein the plurality of communication holes is formed at rotationally symmetrical positions of the partition wall with respect to the axis.

9. The vehicular power transmission device according to claim 1, wherein the first bearing is configured to agitate the lubricating oil only in the first space and the second bearing is configured to agitate the lubricating oil only in the second space.

10. The vehicular power transmission device according to claim 1, wherein the partition wall configures said one space of the first space and the second space as an oil reservoir.

* * * * *